(12) United States Patent
Ling et al.

(10) Patent No.: US 7,724,849 B2
(45) Date of Patent: May 25, 2010

(54) METHODS AND APPARATUS FOR NOISE ESTIMATION IN A COMMUNICATION SYSTEM

(75) Inventors: Fuyun Ling, San Diego, CA (US); Krishna Kiran Mukkavilli, San Diego, CA (US); Gordon Kent Walker, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 863 days.

(21) Appl. No.: 11/516,910

(22) Filed: Sep. 6, 2006

(65) Prior Publication Data

US 2007/0153924 A1 Jul. 5, 2007

Related U.S. Application Data

(60) Provisional application No. 60/756,071, filed on Jan. 3, 2006.

(51) Int. Cl.
 *H03D 1/04* (2006.01)
(52) U.S. Cl. ..................................................... 375/346
(58) Field of Classification Search ................ 375/346, 375/260

See application file for complete search history.

(56) References Cited

U.S. PATENT DOCUMENTS

| 6,456,653 | B1 | 9/2002 | Sayeed | |
|---|---|---|---|---|
| 7,054,375 | B2 * | 5/2006 | Kannan et al. | 375/260 |
| 7,123,580 | B2 * | 10/2006 | Tang et al. | 370/210 |
| 7,190,741 | B1 * | 3/2007 | Manning | 375/324 |
| 2003/0185285 | A1 | 10/2003 | Talwar | |
| 2004/0218519 | A1 | 11/2004 | Chiou et al. | |
| 2005/0105589 | A1 * | 5/2005 | Sung et al. | 375/130 |

FOREIGN PATENT DOCUMENTS

EP 1028562 8/2000

OTHER PUBLICATIONS

Fiksman, "Performance optimization of directly modulated FM-SCM systems with optical discriminator," IEEE Photonics Technology Letters, vol. 5, Issue 7, Jul. 1997, pp. 845-848.*
Zhang, D., et al., "Interference Cancellation for OFDM Systems in Presence of Overlapped Narrow Band Transmission System," IEEE Transactions on Consumer Electronics, IEEE Service Center, New York, NY, US, vol. 50, No. 1, Feb. 2004, pp. 108-114, XP001198115, ISSN: 0098-3063.
International Search Report—PCT/US07/060062, International Search Authority—European Patent Office—Oct. 26, 2007.

* cited by examiner

*Primary Examiner*—Juan A Torres
(74) *Attorney, Agent, or Firm*—Gerald P. Joyce, III

(57) ABSTRACT

Methods and apparatus for noise estimation in a communication system. In an aspect, a method for noise and interference estimation is provided. The method includes identifying one or more unmodulated subcarriers in a received waveform, processing the one or more unmodulated subcarriers to produce a demodulated output, and determining a noise variance based on the demodulated output. In another aspect, an apparatus for providing a noise and interference estimation is provided. The apparatus includes selection logic configured to identify one or more unmodulated subcarriers in a received waveform, a processor configured to demodulate the one or more unmodulated subcarriers to produce a demodulated output, and variance determination logic configured to determine a noise variance based on the demodulated output.

35 Claims, 6 Drawing Sheets

METHODS AND APPARATUS FOR NOISE ESTIMATION IN A COMMUNICATION SYSTEM

CLAIM OF PRIORITY UNDER 35 U.S.C. §119

The present Application for Patent claims priority to Provisional Application No. 60/756,071 entitled "Method and Apparatus of Noise and Interference Estimation in an OFDM Communication System" filed Jan. 3, 2006, and assigned to the assignee hereof and hereby expressly incorporated by reference herein.

BACKGROUND

1. Field

The present application relates generally to the operation of communication systems, and more particularly, to methods and apparatus for noise estimation in a communication system.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner and in such a way as to increase bandwidth utilization and power efficiency.

In current content delivery/media distribution systems, real time and non real time services are packed into a transmission frame and delivered to devices on a network. For example, a communication network may utilize Orthogonal Frequency Division Multiplexing (OFDM) to provide communications between a network server and one or more mobile devices. This technology provides a plurality of subcarriers that are modulated with data representing services to be delivered over a distribution network as a transmit waveform. Thus, the ability to receive and accurately process the transmit waveform determines how well the system will perform.

The signal to interference/noise ratio (SINR) is one of the most important parameters that characterize the signal quality and the receiver performance in a communication system. The SINR is defined as the quotient of the signal power divided by the power of noise and interference.

The estimation of the signal power is well known and relatively simple to determine. Conventionally, a received signal strength indicator (RSSI) is measured and used as an estimate of the signal power. Such an estimate can be quite accurate especially when the interference/noise power is relatively low, i.e., in a communication environment with high SINR. However, it is more difficult to accurately estimate the interference/noise power in such an environment because the weak noise and interference energy is "buried" in the strong signal.

One approach to estimate the interference/noise power in such an environment is to stop the transmission of the signal so the received signal strength measured in such a condition will represent the power of the noise and interference. However, such an approach may not be appropriate for some applications. First of all, during the disruption of transmission, no useful information is transmitted by the transmitter and this reduces the channel's utilization. Moreover, in some communication systems, e.g., an OFDM multimedia broadcasting system, stopping or cycling transmissions from high power transmitters may damage equipment and is not recommended.

Therefore, it would be desirable to have a system that operates to accurately determine an interference and noise estimate at a receiving device in a communication network without disrupting normal network operations, thereby allowing a SINR to be determined so that the performance of the network can be determined and/or optimized.

SUMMARY

In one or more aspects, a noise estimation system is provided that operates to provide noise estimates in a communication system. For example, the system is operable to provide a signal to interference and noise ratio in an OFDM communication system. In an aspect, the system operates to measure noise and interference power at unmodulated subcarriers. The measured values are then used to determine a SINR of the communication system as experienced by a receiving device. As a result, the performance of the communication system can be determined and/or optimized.

In an aspect, a method for noise and interference estimation is provided. The method comprises identifying one or more unmodulated subcarriers in a received waveform, processing the one or more unmodulated subcarriers to produce a demodulated output, and determining a noise variance based on the demodulated output.

In another aspect, an apparatus for providing a noise and interference estimation is provided. The apparatus comprises selection logic configured to identify one or more unmodulated subcarriers in a received waveform, a processor configured to demodulate the one or more unmodulated subcarriers to produce a demodulated output, and variance determination logic configured to determine a noise variance based on the demodulated output.

In another aspect, an apparatus for providing a noise and interference estimation is provided. The apparatus comprises means for identifying one or more unmodulated subcarriers in a received waveform, means for processing the one or more unmodulated subcarriers to produce a demodulated output, and means for determining a noise variance based on the demodulated output.

In another aspect, a computer-readable medium is provided that has a computer program comprising instructions, which when executed, operate to provide a noise and interference estimation. The computer program comprises instructions for identifying one or more unmodulated subcarriers in a received waveform, instructions for processing the one or more unmodulated subcarriers to produce a demodulated output, and instructions for determining a noise variance based on the demodulated output.

In another aspect, at least one processor is provided that is configured to perform a method for providing a noise and interference estimation. The method comprises identifying one or more unmodulated subcarriers in a received waveform, processing the one or more unmodulated subcarriers to produce a demodulated output, and determining a noise variance based on the demodulated output.

In still another aspect, a method for providing a noise and interference estimation is provided. The method comprises generating an OFDM transmission frame that comprises one or more unmodulated subcarriers, encoding location information associated with the one or more unmodulated subcarriers into the transmission frame, and transmitting the transmission frame.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following description when taken in conjunction with the accompanying drawings wherein.

DETAILED DESCRIPTION

In one or more aspects, a noise estimation system is provided that operates to determine noise estimates in a communication network. For example, in an aspect, the power levels at known unmodulated subcarriers in an OFDM communication system are measured to determine noise variance at a receiving device. The determined noise variance is used to determine a SINR that indicates the performance of the communication system. Furthermore, the ability to estimate the noise variance also has advantages with respect to system performance optimization as well. In particular, various algorithms that perform functions such as channel estimation or log likelihood ratio (LLR) computations can benefit from accurate noise variance estimation, which results in better performance.

Aspects of the noise estimation system are described herein with reference to a communication system that utilizes OFDM to provide communications between a network server and one or more mobile devices. In an OFDM communication system, an OFDM symbol is defined that comprises multiple subcarriers. The subcarriers that are modulated with data or other non-zero energy are referred to as modulated subcarriers. The subcarriers that are not modulated with data or other non-zero energy are referred to as unmodulated subcarriers (or "null" subcarriers). For example, unmodulated subcarriers have no energy in the frequency "bins" corresponding to these subcarriers. Thus, aspects of the noise estimation system operate to determine noise and/or interference levels by measuring the power levels at known unmodulated subcarriers. The power levels at the unmodulated subcarriers are then used to determine a noise variance and a SINR at a receiving device.

For the purpose of this description, a specific OFDM network implementation is presented in order to simplify and clarify the aspects. However, it should be noted that aspects of the noise estimation system are suitable for use in other network implementations. In a particular implementation of an OFDM system, a transmission frame is defined that comprises time division multiplex (TDM) pilot signals, frequency division multiplex (FDM) pilot signals, wide area identifiers (WIC), local area identifiers (LIC), positioning signals (PPC), overhead information symbols (OIS), and data symbols. The data symbols are used to transport content and/or services from a server to receiving devices.

Within the transmission frame there are a number of OFDM symbols having known unmodulated subcarriers. For example, the TDM pilot signals, the WIC/LIC symbols, the PPC symbols, and other symbols within the transmission frame comprise some number of known unmodulated subcarriers. Aspects of the noise estimation system utilize these known unmodulated subcarriers to measure noise and interference power at a receiving device.

Figure 1:
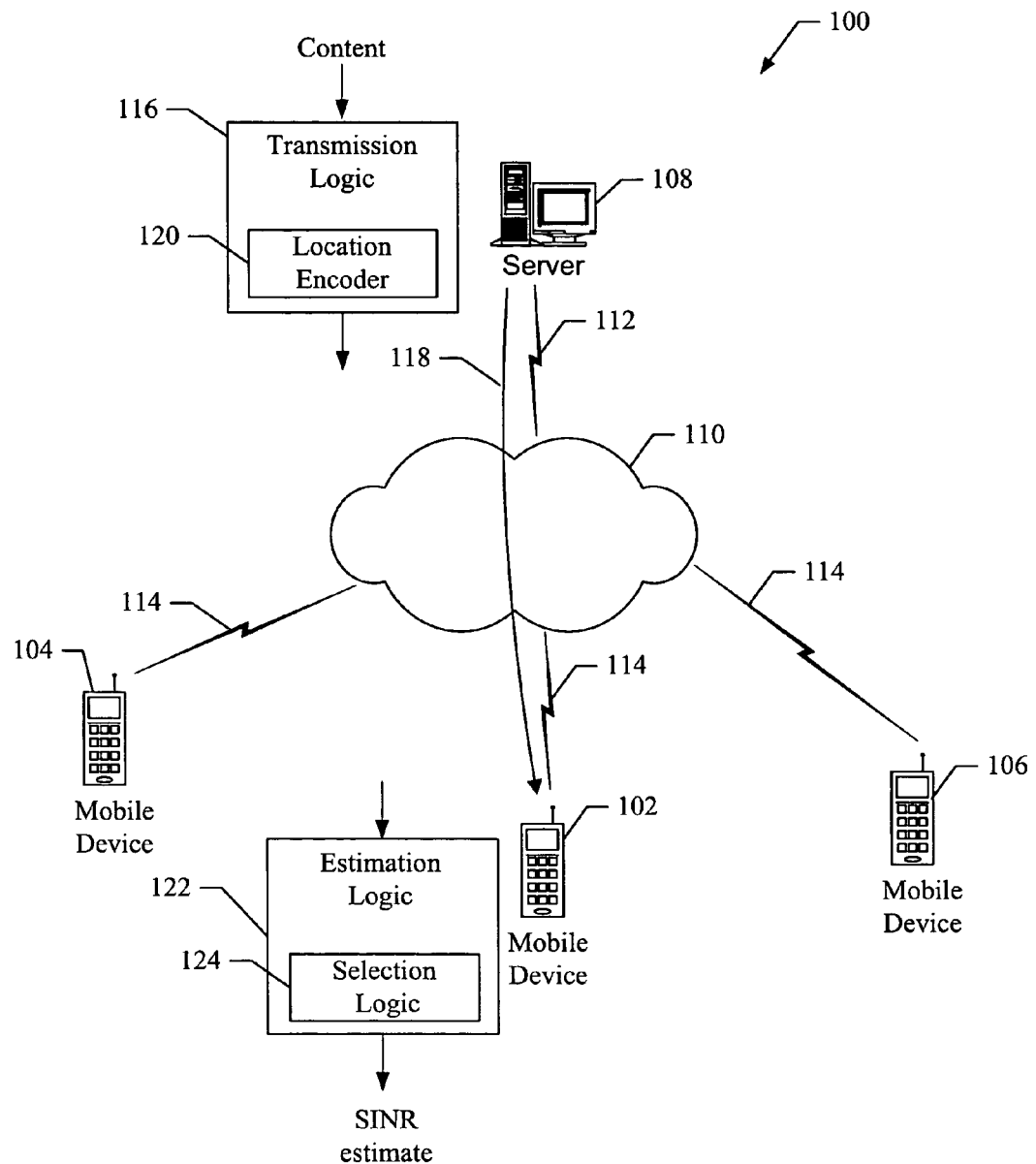
FIG. 1 shows a network that comprises an aspect of a noise estimation system.

FIG. 1 shows a network 100 that comprises an aspect of a noise estimation system. The network 100 comprises mobile devices 102, 104, 106, a server 108, and a communication network 110. For the purpose of this description, it will be assumed that the network 110 operates to provide communications between the server 108 and one or more of the mobile devices using OFDM technology; however, aspects of the noise estimation system are suitable for use with other transmission technologies as well.

In one aspect, the server 108 operates to provide services that may be subscribed to by devices in communication with the network 110. The server 108 is coupled to the network 110 through the communication link 112, which comprises any suitable communication link. The network 110 comprises any combination of wired and/or wireless networks that allows services to be delivered from the server 108 to devices in communication with the network 110, such as the device 102.

The devices 102, 104, and 106 in this aspect comprise mobile telephones that communicate with the network 110 through the wireless links 114. The wireless links 114 comprises forward communication links based on OFDM technology and reverse communication links based on any suitable transmission technology. For the remainder of this description, aspects of the noise estimation system are described with reference to the device 102; however, the aspects are equally applicable to the devices 104 and 106.

It should be noted that the network 110 may communicate with any number and/or types of devices. For example, other devices suitable for use in aspects of the noise estimation system include, but are not limited to, a personal digital assistant (PDA), email device, pager, a notebook computer, mp3 player, video player, or a desktop computer.

The server 108 comprises content that includes real time and non real time services. For example, the services comprise multimedia content that includes news, sports, weather, financial information, movies, and/or applications, programs, scripts, or any other type of suitable content or service. Thus, the services may comprise video, audio or other information formatted in any suitable format.

The content is input to transmission logic 116, which processes the content to produce a transmission frame as described above. The transmission logic 116 operates to transmit the transmission frame over the network 110 as a transmit waveform using OFDM technology, as shown by path 118. In addition to modulated subcarriers comprising data and other information, the transmit waveform comprises unmodulated subcarriers at known locations. For example, the unmodulated subcarriers may be contained in one or more special symbols, such as TDM pilot symbols, WIC/LIC symbols or PPC symbols.

In an aspect, the locations of unmodulated subcarriers in the transmission frame are pre-determined and known to devices in communication with the network 100. For example, the locations of the unmodulated subcarriers in the WIC/LIC symbols are known to the devices in the network 100. In another aspect, the locations of unmodulated subcarriers are dynamically communicated to devices in the network 100. For example, in an aspect, the transmission logic 116 comprises subcarrier location encoder 120 that operates to encode subcarrier location information in the transmission frame. The location information operates to identify the location of unmodulated subcarriers in the transmission frame. Thus, it is possible to dynamically communicate the location of unmodulated subcarriers in the transmission frame to devices in the network 100. It should also be noted that the location of the unmodulated subcarriers may also be communicated using any other suitable technique, such as by transmitting the location information in an out-of-band transmission.

The device 102 receives the transmit waveform at estimation logic 122. The estimation logic 122 operates to determine a noise variance and provide an estimate of the SINR of the communication system experienced at the device 102 by measuring the power at the unmodulated subcarriers. For example, the system utilizes the fact that not all of the subcarriers in the transmit waveform are modulated. As described above, the transmit waveform comprises a few special OFDM symbols, including the TDM, WIC/LIC, and PPC symbols, which are used for synchronization and other purposes. Unlike the normal data OFDM symbols, in which all of the subcarriers are modulated by data, these special symbols comprise a number of known unmodulated subcarriers (i.e., they do not carry any signal power).

When these unmodulated subcarriers are processed (or "demodulated"), the demodulated output should be zero if there is no additive noise and/or interference. Any non-zero values at these unmodulated subcarriers are due to noise and/or interference experienced at the receiving device. The variance of the received noise and interference can be estimated by computing the variance of the demodulated output at these null subcarriers. By dividing the received signal power by the variance of the received noise, the SINR of the communication system as experienced by the device 102 can be determined.

In an aspect, the location of the unmodulated subcarriers is known in advance. For example, the estimation logic 122 at the device 102 knows that the unmodulated subcarriers are located in the special OFDM symbols. However, in another aspect, the location of the unmodulated subcarriers is provided to a receiving device dynamically. For example, the subcarrier location encoder 120 operates to encode the locations of unmodulated subcarriers in the transmit waveform. In another aspect, the subcarrier location encoder 120 communicates the locations of the unmodulated subcarriers in an out-of-band channel, or provides this information to receiving devices in any other fashion.

In an aspect, the estimation logic 122 optionally comprises subcarrier selection logic 124. The selection logic 124 operates to detect the location of unmodulated subcarriers. For example, the selection logic 124 operates to decode the received transmit waveform to determine the location of the unmodulated subcarriers. In another aspect, the selection logic 124 operates to receive the locations of the unmodulated subcarriers in an out-of-band transmission. Thus, the selection logic 124 operates to determine the location of the unmodulated subcarriers when their locations are dynamically changing.

Once the locations of the unmodulated subcarriers are determined, the estimation logic 122 operates to demodulate these subcarriers to measure noise/interference power. A received signal power is also determined from modulated subcarriers, which may be data symbols. The SINR value can be computed by dividing the received signal power by the measured interference/noise power. Similarly, the SINR distribution vs. frequency can be computed the by dividing the signal power received at different frequencies by the measured interference/noise power at corresponding frequencies. Preferably, the unmodulated subcarriers are distributed over the entire OFDM signal bandwidth so that it will be possible to compute the distribution of the noise/interference power vs. frequency. The computed SINR values can be used as an indicator of the signal quality and/or for scaling the LLR values as a decoding metric. In a system with feedback, e.g. OFDMA systems, computed SINR values can be used for rate adaptation and bin energy/bit loading to improve system capacity.

Therefore, aspects of a noise estimation system operate to determine a SINR by performing one or more of the following functions at a transmitting device.
a. Encode content/services into an OFDM transmission frame that comprises known unmodulated subcarriers.
b. Optionally encode the location of unmodulated subcarriers into the transmission frame.
c. Transmit the transmission frame over a network to receiving devices.

Therefore, aspects of a noise estimation system operate to determine a SINR by performing one or more of the following functions at a receiving device.
a. Receive a transmit waveform that comprises unmodulated subcarriers.
b. Determine the locations of unmodulated subcarriers.
c. Measure noise/interference power at the unmodulated subcarriers.
d. Measure received signal power.
e. Determine an SINR from the noise/interference power and the signal power.

As described above, the variance of the demodulated output at the unmodulated subcarriers provides a good estimate of the variance of the noise/interference received by the receiver. In an aspect, the unmodulated subcarriers are evenly distributed over the entire band, which allows a determination of the noise/interference distribution. This information can be useful to further improve the receiver performance. The noise estimation system operates by taking advantage of the properties of the special OFDM symbols that are constructed to comprise unmodulated subcarriers. As a result, there is no disruption of the normal transmitter/receiver operation. Furthermore, the system is resource efficient since computing the noise/interference variance is straight forward and simple to implement in a receiver Therefore, aspects of a noise estimation system operate to efficiently determine noise variance and corresponding SINR levels at a receiving device. It should be noted that the noise estimation system is not limited to the implementations described with reference to FIG. 1, and that other implementations are possible.

Figure 2:
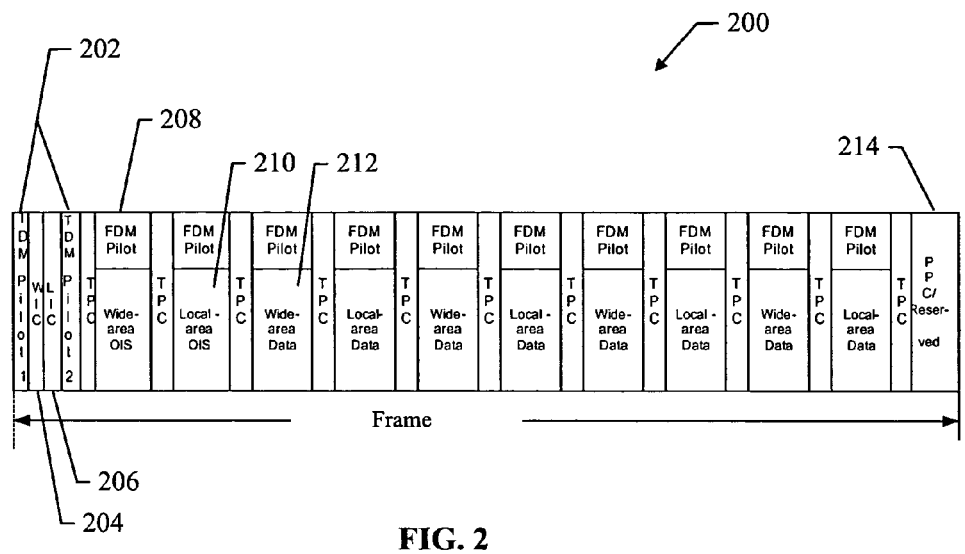
FIG. 2 shows an aspect of a transmission frame for use in a noise estimation system.

FIG. 2 shows an aspect of a transmission frame 200 for use in a noise estimation system. For example, the transmission frame 200 may be used in a forward link only (FLO) communication system. The frame 200 comprises time division multiplex (TDM) pilot signals 202, WIC symbols 204, LIC symbols 206, frequency division multiplex (FDM) pilot signals 208, overhead information symbols (OIS) 210, data symbols 212, and PPC symbols 214. The data symbols 212 are used to transport services from a server to receiving devices.

In an aspect, the TDM 202, WIC 204, LIC 206 and PPC 214 symbols represent special symbols in which not all of their subcarriers are modulated. Thus, these symbols are already designed to include known unmodulated subcarriers and are therefore suitable for use in aspects of a noise estimation system. It is also possible that other symbols in the transmission frame 200 contain unmodulated subcarriers which could be utilized. Furthermore, in a dynamic implementation, the noise estimation system operates to dynamically determine any subcarriers in the frame 200 that are unmodulated and encode location information into the frame 200 that identifies these unmodulated subcarriers.

Figure 3:
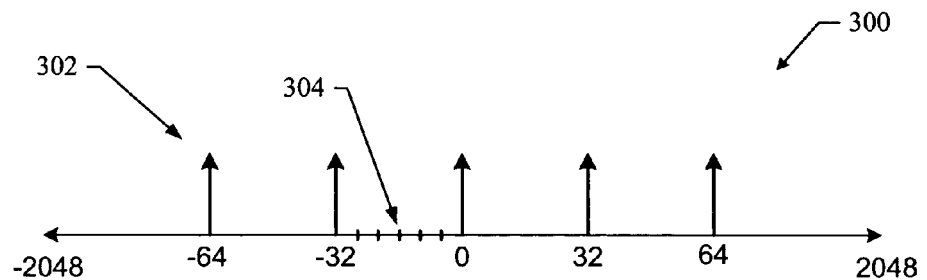
FIG. 3 shows an aspect of a TDM symbol in the frequency domain comprising unmodulated subcarriers for use in a noise estimation system.

FIG. 3 shows an aspect of a TDM symbol 300 comprising unmodulated subcarriers for use in a noise estimation system. For example, the TDM symbol 300 may be one of the TDM symbols 202 shown in FIG. 2.

The TDM symbol 300 comprises modulated subcarriers 302 spaced over selected frequency intervals. Between the modulated subcarriers are unmodulated subcarriers 304. The unmodulated subcarriers 304 contain no signal power so that any power received at these subcarrier locations is due to noise and interference.

Figure 4:
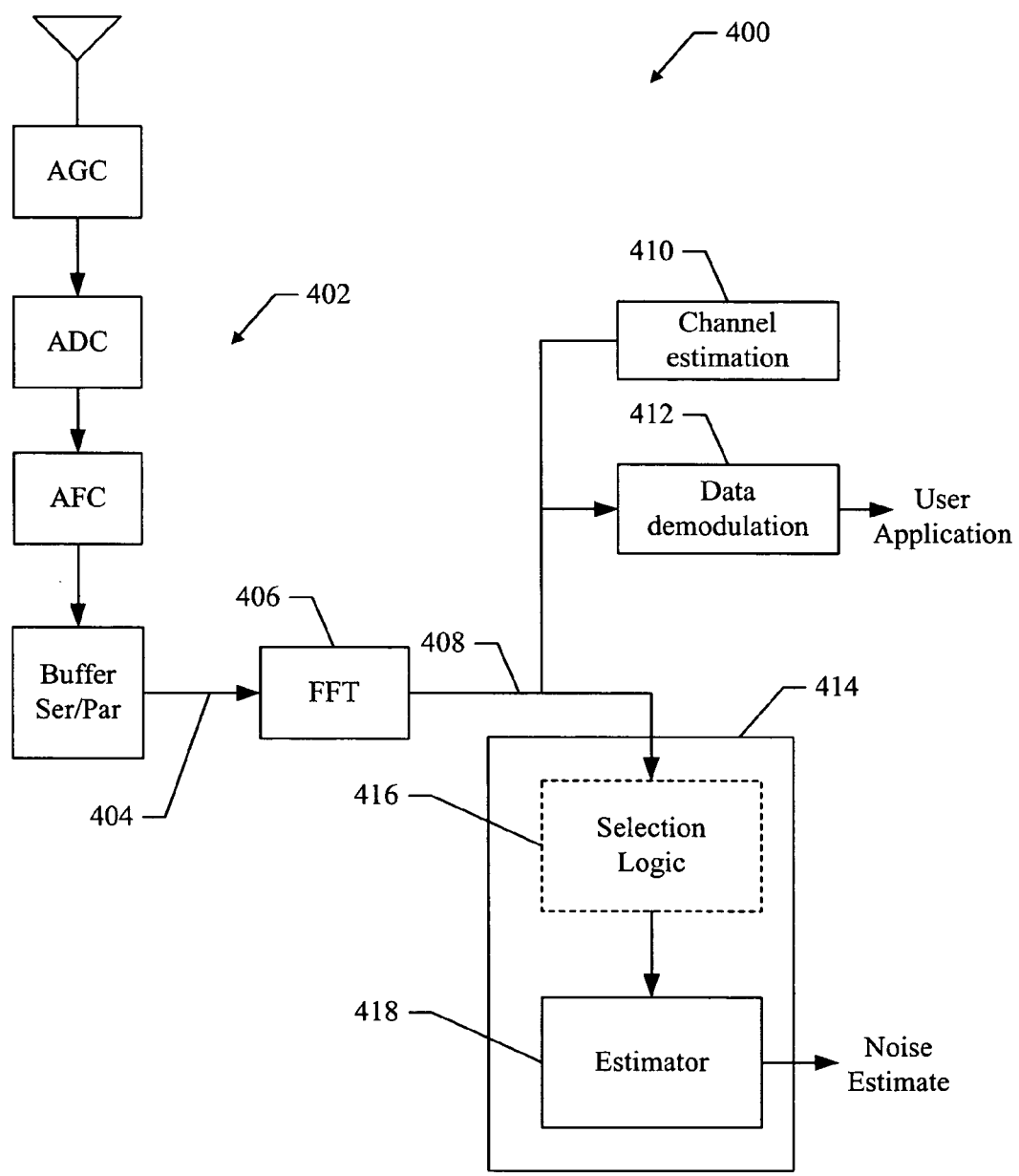
FIG. 4 shows a receiver that comprises an aspect of a noise estimation system.

FIG. 4 shows an aspect of a receiver 400 for use in a noise estimation system. For example, the receiver 400 is suitable for use at the devices 102, 104, and 106 shown in FIG. 1.

The receiver 400 comprises radio frequency (RF) processing logic 402 that operates to receive and process a transmit waveform. For example, the RF processing logic 402 is suitable to receive and process the transmit waveform shown at path 118 in FIG. 1. The RF processing logic 402 operates to produce a time domain waveform 404 comprising a transmission frame that is input to fast Fourier transform (FFT) logic 406.

The FFT logic 406 operates to transform the time domain waveform 404 to produce a frequency domain waveform 408 that comprises symbols having a plurality of subcarriers. The frequency domain waveform 408 is input to channel estimation logic 410 that operates to provide channel estimates. The frequency domain waveform 408 is also input to data demodulator 412 that operates to demodulate modulated subcarriers in data symbols to produce data that is passed to user applications.

The frequency domain waveform 408 is also input to estimation logic 414. For example, the estimation logic 414 is suitable for use as the estimation logic 122 shown in FIG. 1. The estimation logic 414 comprises subcarrier selection logic 416. The subcarrier selection logic 414 operates to identify unmodulated subcarriers in the frequency domain waveform 408. For example, the unmodulated subcarriers may be contained in special symbols as described above, or may be identified in the transmission frame. The estimation logic 414 also comprises estimator 418. In an aspect, the estimator 418 operates to process the unmodulated subcarriers to estimate the noise variance as experienced at the receiver 400. The noise variance is then used to determines a SINR estimate.

Figure 5:
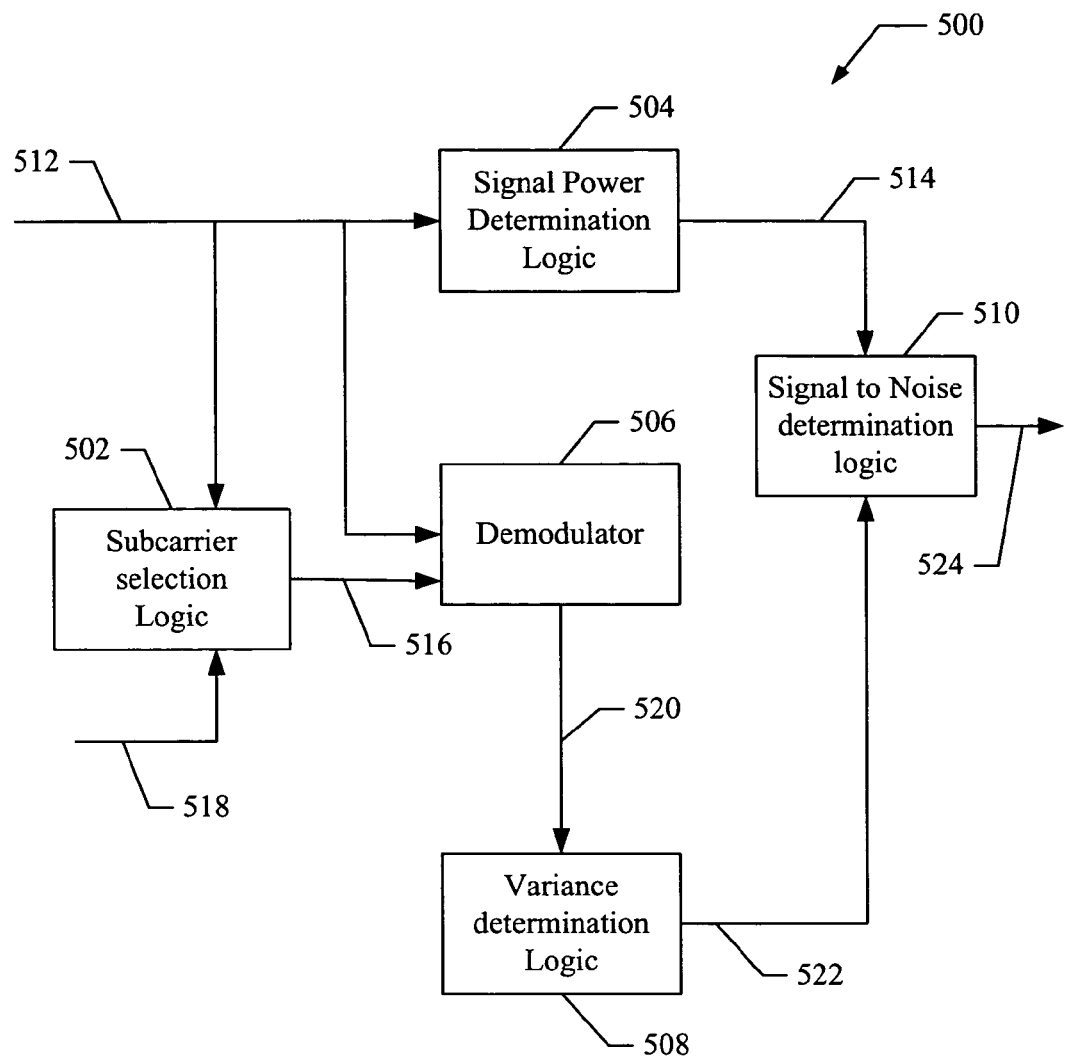
FIG. 5 shows an aspect of noise estimation logic for use in a noise estimation system.

FIG. 5 shows an aspect of estimation logic 500 for use in a noise estimation system. For example, the estimation logic 500 is suitable for use as the estimation logic 122 shown in FIG. 1 or the estimation logic 414 shown in FIG. 4. The estimation logic 500 comprises subcarrier selection logic 502, signal power determination logic 504, demodulator 506, variance determination logic 508, and signal to noise determination logic 510.

The signal power determination logic 504 comprises any suitable hardware and/or software that operates to receive a frequency domain waveform 512 comprising a plurality of subcarriers and determine signal power. For example, the frequency domain waveform 512 may be the waveform 408 shown in FIG. 4. The signal power determination logic 504 outputs a signal power indicator 514 to the signal to noise determination logic 510.

The subcarrier selection logic 502 comprises a CPU, processor, gate array, hardware logic, virtual machine, software, and/or any combination of hardware and software. The selection logic 502 operates to identify the location of unmodulated subcarriers in the received waveform 512. In an aspect, the subcarrier selection logic 502 identifies known unmodulated subcarriers in special symbols included in the received waveform 512. For example, the known unmodulated subcarriers may be part of TDM, WIC, LIC, PPC or any other symbol in a received waveform 512. For example, the known unmodulated symbols may be part of TDM symbols as illustrated in FIG. 3. The subcarrier selection logic 502 provides a selection signal 516 to the demodulator that indicates the location of the unmodulated subcarriers.

In another aspect, the subcarrier selection logic 502 operates to determine the location of unmodulated subcarriers by decoding the received waveform 512. For example, in an aspect, the location of the unmodulated subcarriers is encoded into the received waveform 512 by the transmission logic 116. In another aspect, the selection logic 502 receives the location of the unmodulated subcarriers in an out-to-band communication 518.

The demodulator 506 comprises a CPU, processor, gate array, hardware logic, virtual machine, software, and/or any combination of hardware and software. The demodulator 506 operates to receive the selection signal 516 and the received waveform 512 to select and process (i.e., demodulate) unmodulated subcarriers. For example, the selection signal 516 identifies subcarriers in special symbols in the received waveform 512. The demodulator 506 then demodulates these subcarriers to produce a demodulated output 520 that is input to the variance determination logic 508.

The variance determination logic 508 comprises a CPU, processor, gate array, hardware logic, virtual machine, software, and/or any combination of hardware and software. The variance determination logic 508 operates to receive the demodulated output 520 and determine a variance 522 that is input to the signal to noise determination logic 510. In an aspect, the variance determination logic 508 operates to perform an algorithm to determine the variance 522. A more detailed description of the algorithm is provided in another section of this document.

The signal to noise determination logic 510 comprises a CPU, processor, gate array, hardware logic, virtual machine, software, and/or any combination of hardware and software. The signal to noise determination logic 510 operates to receive the variance 522 and the signal power indicator 514 and computers a SINR 524. For example, in an aspect, the signal to noise determination logic 510 operates to divide the signal power 514 by the variance 522 to determine the SINR 524.

In an aspect, the noise estimation system comprises a computer program having one or more program instructions ("instructions") stored on a computer-readable medium, which when executed by at least one processor, provides the functions of the noise estimation system described herein. For example, instructions may be loaded into the estimation logic 500 from a computer-readable media, such as a floppy disk, CDROM, memory card, FLASH memory device, RAM, ROM, or any other type of memory device. In another aspect, the instructions may be downloaded into the estimation logic 500 from an external device or network resource. The instructions, when executed by the estimation logic 500 operate to provide aspects of a noise estimation system as described herein.

Thus, the estimation logic 500 operates to determine a noise variance and SINR of a communication network as experienced at a receiving device. It should be noted that the estimation logic 500 is just one implementation and that other implementations are possible within the scope of the aspects. For example, the functions of estimation logic 500 may be embodied in a computer program that is executed by one or more processors.

Noise Variance Algorithm

In one or more aspects, the variance determination logic 508 operates to perform an algorithm to compute a noise variance based on received unmodulated subcarriers. The following is a description of one aspect of the algorithm.

It will be assumed that $y_0, y_1, \ldots y_N$ correspond to the time domain samples of a special symbol that is identified to contain unmodulated carriers. The $k^{th}$ frequency domain subcarrier can be obtained via a discrete Fourier transform as follows.

$$Y(k) = \frac{1}{\sqrt{N}} \sum_{n=0}^{N-1} y_n e^{\frac{j2\pi nk}{N}}$$

If the subcarrier selection logic 502 has identified the subcarriers $k_1, k_2, \ldots k_P$ to correspond to unmodulated subcarriers in the frequency domain, then the noise and interference variance estimate can be obtained from the following expression.

$$\sigma^2 = \frac{1}{P} \sum_{l=1}^{P} |Y(k_l)|^2.$$

It should be noted that other possible implementations of this algorithm as well as other noise and interference variance estimations are also possible. In the case of WIC/LIC symbols, only selected subcarriers may be unmodulated. In an aspect, an interlace is defined that identifies selected subcarriers in the symbol. For example, interlace 0 defines a collection of subcarriers with indices of the form 8 m (where m=0, 1,2, ... 511). This collection of subcarriers is modulated with non-zero energy, while all the remaining subcarriers in the symbol are unmodulated subcarriers. For reduced implementation complexity as well as providing sufficiently reliable noise and interference estimation, the estimation logic 500 operates to compute the noise and interference variance based only on interlace (s) where interlace s corresponds to subcarriers with indices of the form 8m+s (where s=1,2 ... 7, and m=0,1,2 ... 511). Similarly, interlaces or part of interlaces can be chosen for noise and variance estimation in the case of TDM and PPC symbols as well.

Figure 6:
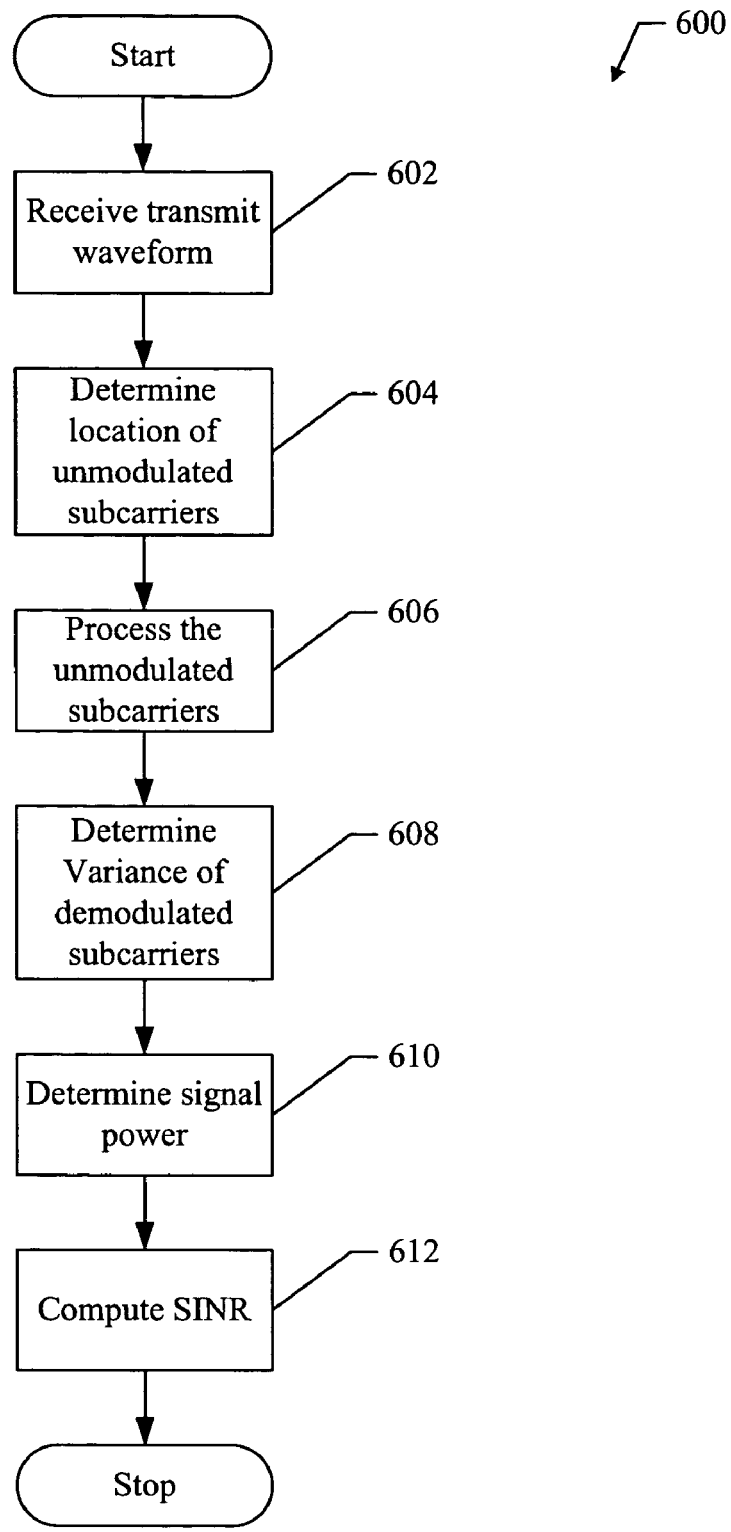
FIG. 6 shows an aspect of a method for providing a noise estimation system.

FIG. 6 shows an aspect of a method 600 for providing a noise estimation system. For example, the estimation logic 500 is configured to perform the method 600 as describe below.

At block 602, a transmit waveform is received that comprises a transmission frame having special symbols that contain one or more unmodulated sub-carriers. In an aspect, the transmit waveform is received at a device from an OFDM network. For example, the received transmit waveform may be the waveform 512 shown in FIG. 5.

At block 604, the location of unmodulated subcarriers is determined. In an aspect, the selection logic 502 identifies the location of the unmodulated subcarriers in the transmit waveform 512. For example, the unmodulated subcarriers are located at fixed locations in special symbols of the waveform 512 that are known to the selection logic 502. In another aspect, the locations of the unmodulated subcarriers are encoded into the waveform 512 and decoded by the selection logic 502. In another aspect, the locations of the unmodulated subcarriers are provided to the selection logic 502 in an out-of-band transmission 518. The selection logic 502 operates to determine the locations of the unmodulated subcarriers in any of the above implementations and provides the selection signal 516 that identifies the locations of the unmodulated subcarriers.

At block 606, the unmodulated subcarriers are processed (i.e., demodulated). In an aspect, the demodulator 506 operates to demodulate the unmodulated subcarriers to produce the demodulated output 520. For example, the demodulator 506 receives the selection signal 516, which identifies the locations of unmodulated subcarriers to be processed.

At block 608, a variance of the demodulated output is determined. For example, the variance determination logic 508 operates to determine the variance of the demodulated output 520 to produce the variance output 522. In an aspect, the variance determination logic 508 operates to perform the noise variance algorithm described above to determine the variance output 522.

At block 610, a signal power associated with the received waveform is determined. In an aspect, the signal power determination logic 504 operates to determine the signal power 514 of the received waveform 512 using any suitable technique.

At block 612, a SINR is determined. In an aspect, the signal to noise determination logic 510 operates to determine the SINR 524 from the variance output 522 and the signal power 514. For example, the signal power 514 is divided by the variance output 522 to determine the SINR 524.

Thus, the method 600 operates to determine a noise variance and SINR of a communication system as experienced by a receiving device. It should be noted that the method 600 represents just one implementation and the changes, additions, deletions, combinations or other modifications of the method 600 are possible within the scope of the aspects.

Figure 7:
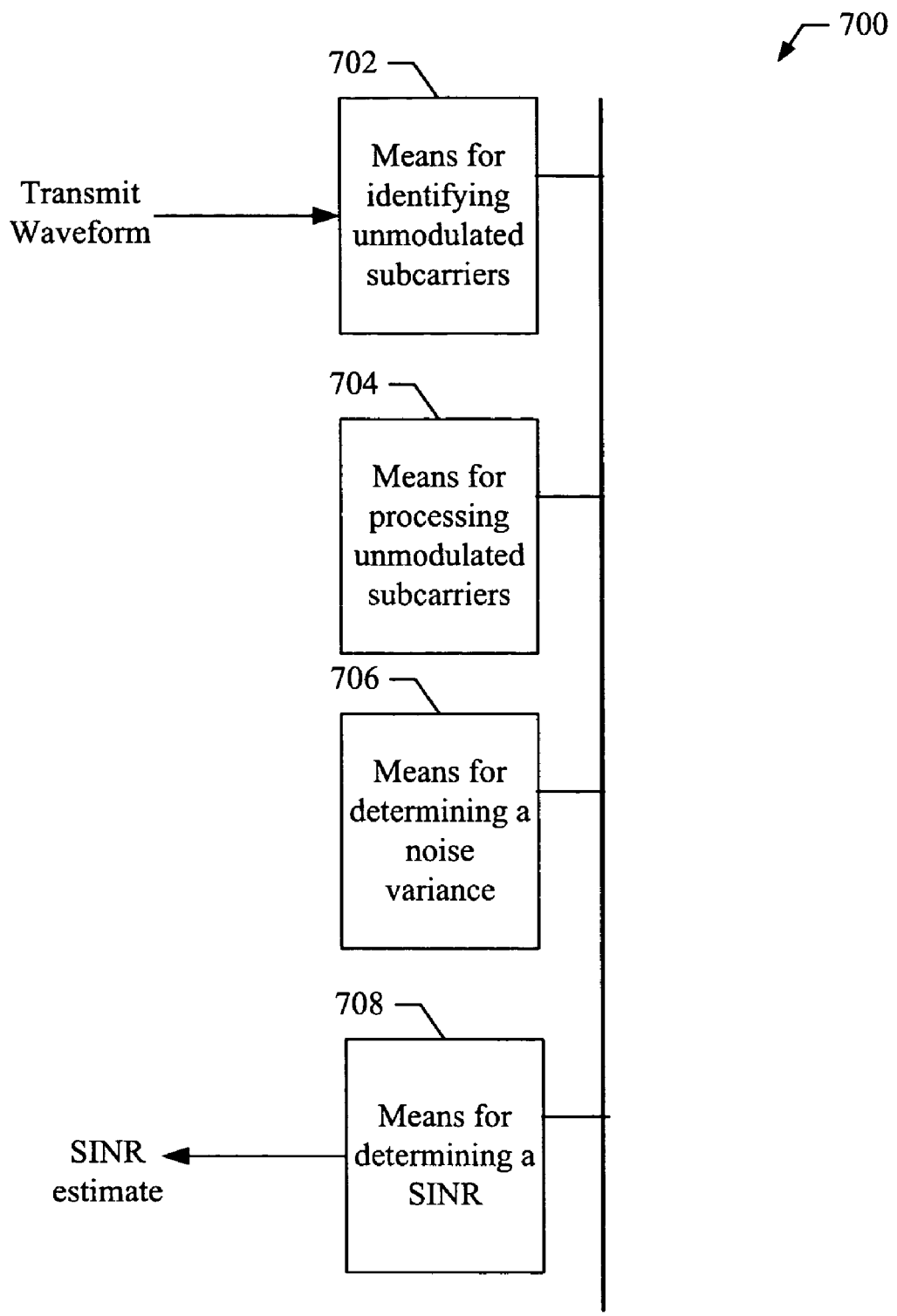
FIG. 7 shows an aspect of a noise estimation system.

FIG. 7 shows an aspect of a noise estimation system 700. The noise estimation system 700 comprises means (702) for identifying unmodulated subcarriers, means (704) for processing the unmodulated subcarriers, means (706) for determining a noise variance, and means (708) for determining a SINR.

In an aspect, the means 702 comprises the subcarrier selection logic 502, the means 704 comprises the demodulator 506, the means 706 comprises the variance determination logic 508, and the means 708 comprises the signal to noise determination logic 510. In another aspect, the means 702-708 are implemented by at least one processor configured to execute program instructions to provide aspects of a noise estimation system as described herein.

Therefore various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a noise estimation system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for providing a noise and interference estimation, the method comprising:
    identifying within a wireless mobile device one or more unmodulated subcarriers in a received waveform;
    processing within the wireless mobile device the one or more unmodulated subcarriers to produce a demodulated output; and
    determining within the wireless mobile device a noise variance $\sigma^2$ based on the demodulated output by computing the equation $$\sigma^2 = \frac{1}{P}\sum_{l=1}^{P} |Y(k_l)|^2, \text{ where:}$$

the $k^{th}$ frequency domain subcarrier $$Y(k) = \frac{1}{\sqrt{N}}\sum_{n=0}^{N-1} y_n e^{\frac{j2\pi snk}{N}};$$

$y_n$ correspond to time domain samples of a special symbol identified to contain unmodulated carriers;
s correspond to the interlace that identifies selected subcarriers in the symbol; N is a number of time domain samples; and
P is a number of unmodulated subcarriers.

2. The method of claim 1, further comprising:
    determining within the wireless mobile device a signal power associated with the received waveform and
    determining within the wireless mobile device a signal to noise and interference ratio (SINR) by dividing the signal power by the noise variance.

3. The method of claim 1, wherein said identifying comprises identifying the one or more unmodulated subcarriers at known locations in the received waveform.

4. The method of claim 1, wherein said identifying comprises identifying the one or more unmodulated subcarriers based on information encoded in the received waveform.

5. The method of claim 1, wherein said identifying comprises identifying the one or more unmodulated subcarriers in one or more non data symbols included in the received waveform.

6. The method of claim 1, wherein said identifying comprises identifying the one or more unmodulated subcarriers in one or more of time division multiplex (TDM), wide area identifiers (WIC), local area identifiers (LIC), and positioning signals (PPC) symbols included in the received waveform.

7. The method of claim 1, further comprising receiving the received waveform in an orthogonal frequency division multiplex (OFDM) network transmission.

8. An apparatus for providing a noise and interference estimation, the apparatus comprising:
    selection logic configured to identify one or more unmodulated subcarriers in a received waveform;
    a processor configured to demodulate the one or more unmodulated subcarriers to produce a demodulated output; and
    variance determination logic configured to determine a noise variance $\sigma^2$ based on the demodulated output, where $$\sigma^2 = \frac{1}{P}\sum_{l=1}^{P} |Y(k_l)|^2, \text{ and where:}$$

the $k^{th}$ frequency domain subcarrier $$Y(k) = \frac{1}{\sqrt{N}}\sum_{n=0}^{N-1} y_n e^{\frac{j2\pi snk}{N}};$$

$y_n$ correspond to time domain samples of a special symbol identified to contain unmodulated carriers;
s correspond to the interlace that identifies selected subcarriers in the symbol; N is a number of time domain samples; and
P is a number of unmodulated subcarriers.

9. The apparatus of claim 8, further comprising:
    signal power determination logic configured to determine a signal power associated with the received waveform and
    signal to noise determination logic configured to determine a signal to noise and interference ratio (SINR) by dividing the signal power by the noise variance.

10. The apparatus of claim 8, wherein said one or more unmodulated subcarriers are located at known locations in the received waveform.

11. The apparatus of claim 8, wherein said one or more unmodulated sub carriers are located at dynamic locations based on information encoded in the received waveform.

12. The apparatus of claim 8, wherein said one or more unmodulated subcarriers are located in one or more non data symbols included in the received waveform.

13. The apparatus of claim 8, wherein said one or more unmodulated subcarriers are located in one or more of time division multiplex (TDM), wide area identifiers (WIC), local area identifiers (LIC), and positioning signals (PPC) symbols included in the received waveform.

14. The apparatus of claim 8, further comprising receiving logic configured to receive the received waveform in an orthogonal frequency division multiplex (OFDM) network transmission.

15. An apparatus for providing a noise and interference estimation, the apparatus comprising:
  means for identifying one or more unmodulated subcarriers in a received waveform;
  means for processing the one or more unmodulated subcarriers to produce a demodulated output; and
  means for determining a noise variance $\sigma^2$ based on the demodulated output, where $$\sigma^2 = \frac{1}{P}\sum_{l=1}^{P} |Y(k_l)|^2, \text{ and where:}$$

the $k^{th}$ frequency domain subcarrier $$Y(k) = \frac{1}{\sqrt{N}}\sum_{n=0}^{N-1} y_n e^{\frac{j2\pi snk}{N}};$$

$y_n$ correspond to time domain samples of a special symbol identified to contain unmodulated carriers;
s correspond to the interlace that identifies selected subcarriers in the symbol; N is a number of time domain samples; and
P is a number of unmodulated subcarriers.

16. The apparatus of claim 15, further comprising:
  means for determining a signal power associated with the received waveform and
  means for determining a signal to noise and interference ratio (SINR) by dividing the signal power by the noise variance.

17. The apparatus of claim 15, wherein said means for identifying comprises means for identifying the one or more unmodulated subcarriers at known locations in the received waveform.

18. The apparatus of claim 15, wherein said means for identifying comprises means for identifying the one or more unmodulated subcarriers based on information encoded in the received waveform.

19. The apparatus of claim 15, wherein said means for identifying comprises means for identifying the one or more unmodulated subcarriers in one or more non data symbols included in the received waveform.

20. The apparatus of claim 15, wherein said means for identifying comprises means for identifying the one or more unmodulated subcarriers in one or more of time division multiplex (TDM), wide area identifiers (WIC), local area identifiers (LIC), and positioning signals (PPC) symbols included in the received waveform.

21. The apparatus of claim 15, further comprising means for receiving the received waveform in an orthogonal frequency division multiplex (OFDM) network transmission.

22. A computer-readable storage medium having stored thereon a computer program comprising instructions which when executed operate to provide a noise and interference estimation, the computer program comprising:
  instructions for identifying one or more unmodulated subcarriers in a received waveform;
  instructions for processing the one or more unmodulated subcarriers to produce a demodulated output; and
  instructions for determining a noise variance $\sigma^2$ based on the demodulated output, where $$\sigma^2 = \frac{1}{P}\sum_{l=1}^{P} |Y(k_l)|^2, \text{ and where:}$$

the $k^{th}$ frequency domain subcarrier $$Y(k) = \frac{1}{\sqrt{N}}\sum_{n=0}^{N-1} y_n e^{\frac{j2\pi snk}{N}};$$

$y_n$ correspond to time domain samples of a special symbol identified to contain unmodulated carriers;
s correspond to the interlace that identifies selected subcarriers in the symbol; N is a number of time domain samples; and
P is a number of unmodulated subcarriers.

23. The computer-readable storage medium of claim 22, wherein the computer program further comprises:
  instructions for determining a signal power associated with the received waveform and
  instructions for determining a signal to noise and interference ratio (SINR) by dividing the signal power by the noise variance.

24. The computer-readable storage medium of claim 22, wherein said instructions for identifying comprises instructions for identifying the one or more unmodulated subcarriers at known locations in the received waveform.

25. The computer-readable storage medium of claim 22, wherein said instructions for identifying comprises instructions for identifying the one or more unmodulated subcarriers based on information encoded in the received waveform.

26. The computer-readable storage medium of claim 22, wherein said instructions for identifying comprises instructions for identifying the one or more unmodulated subcarriers in one or more non data symbols included in the received waveform.

27. The computer-readable storage medium of claim 22, wherein said instructions for identifying comprises instructions for identifying the one or more unmodulated subcarriers in one or more of time division multiplex (TDM), wide area identifiers (WIC), local area identifiers (LIC), and positioning signals (PPC) symbols included in the received waveform.

28. The computer-readable storage medium of claim 22, wherein the computer program further comprises instructions for receiving the received waveform in an orthogonal frequency division multiplex (OFDM) network transmission.

29. At least one processor configured to perform a method for providing a noise and interference estimation, the method comprising:

identifying one or more unmodulated subcarriers in a received waveform;
processing the one or more unmodulated subcarriers to produce a demodulated output; and
determining a noise variance $\sigma^2$ based on the demodulated output, where $$\sigma^2 = \frac{1}{P}\sum_{l=1}^{P} |Y(k_l)|^2, \text{ and where:}$$

the $k^{th}$ frequency domain subcarrier $$Y(k) = \frac{1}{\sqrt{N}}\sum_{n=0}^{N-1} y_n e^{\frac{j2\pi snk}{N}};$$

$y_n$ correspond to time domain samples of a special symbol identified to contain unmodulated carriers;
s correspond to the interlace that identifies selected subcarriers in the symbol; N is a number of time domain samples; and
P is a number of unmodulated subcarriers.

30. The method of claim 29, further comprising:
determining a signal power associated with the received waveform and
determining a signal to noise and interference ratio (SINR) by dividing the signal power by the noise variance.

31. The method of claim 29, wherein said identifying comprises identifying the one or more unmodulated subcarriers at known locations in the received waveform.

32. The method of claim 29, wherein said identifying comprises identifying the one or more unmodulated subcarriers based on information encoded in the received waveform.

33. The method of claim 29, wherein said identifying comprises identifying the one or more unmodulated subcarriers in one or more non data symbols included in the received waveform.

34. The method of claim 29, wherein said identifying comprises identifying the one or more unmodulated subcarriers in one or more of time division multiplex (TDM), wide area identifiers (WIC), local area identifiers (LIC), and positioning signals (PPC) symbols included in the received waveform.

35. The method of claim 29, further comprising receiving the received waveform in an orthogonal frequency division multiplex (OFDM) network transmission.

\* \* \* \* \*